United States Patent
Schaeuble

(10) Patent No.: US 10,035,495 B2
(45) Date of Patent: Jul. 31, 2018

(54) WIPER ARM FOR A WINDSCREEN WIPER SYSTEM OF A MOTOR VEHICLE, WIPER BLADE AND WIPER DEVICE

(71) Applicant: Valeo Systèmes d'Essuyage, Le Mesnil Saint Denis (FR)

(72) Inventor: Michael Schaeuble, Vaihingen/enz (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 74 days.

(21) Appl. No.: 14/891,245

(22) PCT Filed: May 5, 2014

(86) PCT No.: PCT/EP2014/059136
§ 371 (c)(1),
(2) Date: Nov. 13, 2015

(87) PCT Pub. No.: WO2014/184036
PCT Pub. Date: Nov. 20, 2014

(65) Prior Publication Data
US 2016/0129887 A1 May 12, 2016

(30) Foreign Application Priority Data
May 13, 2013 (DE) .......................... 10 2013 104 900

(51) Int. Cl.
*B60S 1/48* (2006.01)
*B60S 1/38* (2006.01)
*B60S 1/40* (2006.01)
*B60S 1/34* (2006.01)
*B60S 1/52* (2006.01)

(52) U.S. Cl.
CPC ............... *B60S 1/48* (2013.01); *B60S 1/3425* (2013.01); *B60S 1/3862* (2013.01);
(Continued)

(58) Field of Classification Search
CPC ...... B60S 1/524; B60S 1/3862; B60S 1/4048; B60S 2001/4058; B60S 2001/4051;
(Continued)

(56) References Cited

FOREIGN PATENT DOCUMENTS

DE     102008049269 A1 *  4/2010  ............. B60S 1/381
DE     10 2010 047098 A1    4/2012
(Continued)

OTHER PUBLICATIONS

DE102008049269A1 (machine translation), 2010.*
(Continued)

*Primary Examiner* — Andrew A Horton
(74) *Attorney, Agent, or Firm* — Osha Liang LLP

(57) ABSTRACT

The invention relates to a wiper arm (10) for a windscreen wiper system of a motor vehicle, with a receiving region (11) for a wiper blade adapter (55) consisting of several wiper blade adapter elements (56; 56a, 57; 57a, 58), wherein the wiper arm (10) has a securing element (65; 65a) which at least partially covers the receiving region (11), wherein the securing element (65; 65a) is constructed such that it is movable between a dismantling position, in which the wiper blade adapter (55) is removed from the receiving region (11), and a locking position, in which the wiper blade adapter (55) is held in the receiving region (11), wherein an adapter element (75) serving to supply washing fluid and/or to supply power is arranged in the receiving region (11), and wherein the adapter element (75), on the one hand, can be connected to a supply line for the washing fluid and/or to an electric line (79) and, on the other hand, has an outlet (77) for the washing fluid and/or a plug connection (78) for the electric line (79), wherein the outlet (77) and/or the plug connection (78) can be connected to a first wiper blade adapter element (56; 56a).

13 Claims, 6 Drawing Sheets

Figure 1:
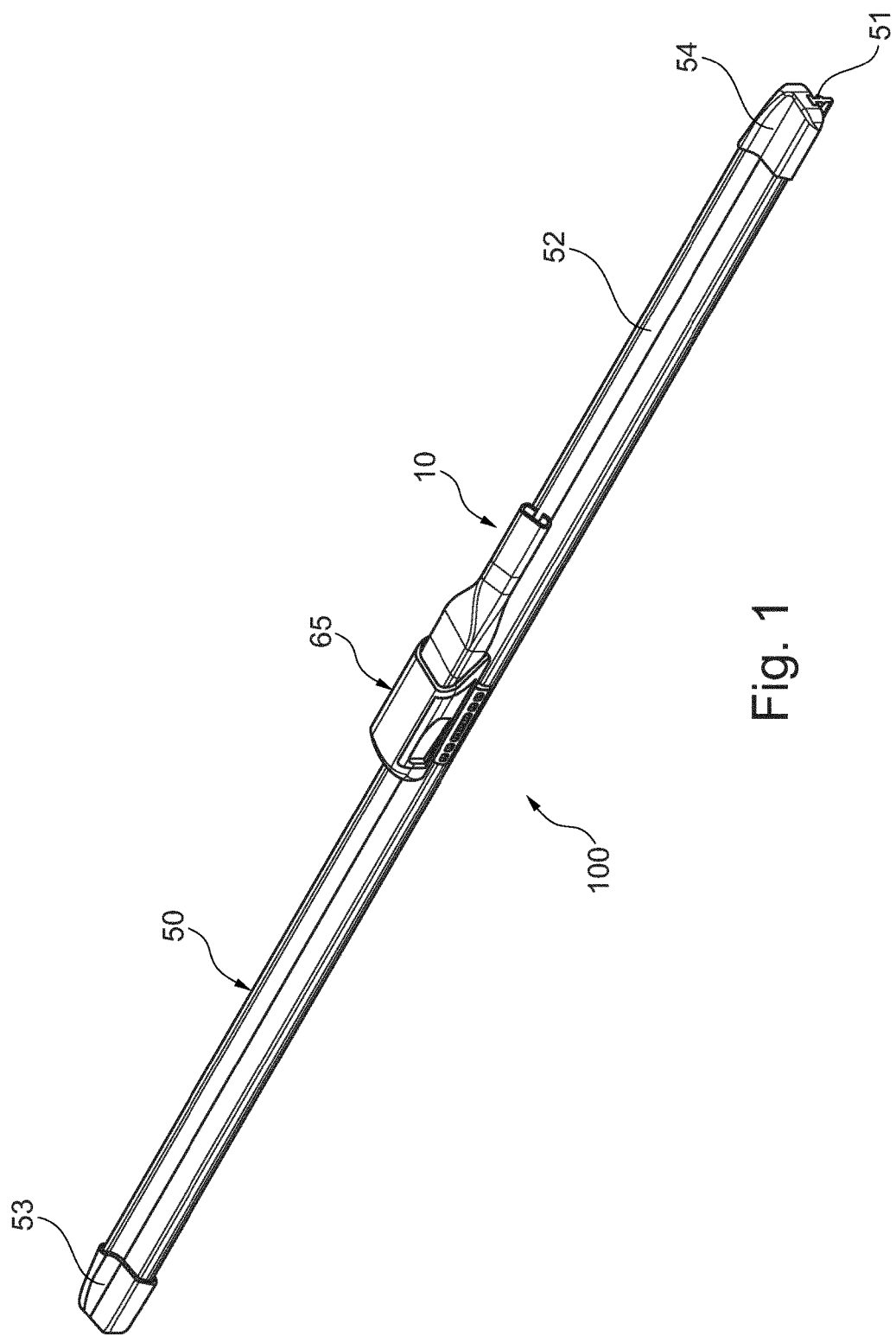

(52) U.S. Cl.
CPC ........... *B60S 1/4048* (2013.01); *B60S 1/3805* (2013.01); *B60S 1/524* (2013.01); *B60S 2001/4051* (2013.01); *B60S 2001/4058* (2013.01)

(58) Field of Classification Search
CPC ...... B60S 2001/4054; B60S 2001/4061; B60S 1/4045
USPC ...................................................... 15/250.04
See application file for complete search history.

(56) References Cited

FOREIGN PATENT DOCUMENTS

| DE | 10 2010 049740 A1 | 5/2012 |
|---|---|---|
| DE | 10 2010 052308 A1 | 5/2012 |
| DE | 10 2010 052314 A1 | 5/2012 |
| DE | 10 2011 118 220 A1 | 5/2012 |
| DE | 10 2010 056366 A1 | 7/2012 |
| DE | 10 2011 001689 A1 | 10/2012 |
| FR | 2 968 256 A1 | 6/2012 |
| WO | 2012072300 A1 | 6/2012 |

OTHER PUBLICATIONS

DE102010052314A1 (machine translation), 2012.*
International Search Report issued in PCT/EP2014/059136 dated Jul. 9, 2014 (2 pages).
Written Opinion of the International Searching Authority issued in PCT/EP2014/059136 dated Jul. 9, 2014 (6 pages).
German Search Report in Patent application No. 10 2013 104 900.1 dated Mar. 17, 2013 (3 pages).

* cited by examiner

WIPER ARM FOR A WINDSCREEN WIPER SYSTEM OF A MOTOR VEHICLE, WIPER BLADE AND WIPER DEVICE

PRIOR ART

The invention relates to a wiper arm for a windscreen wiper system of a motor vehicle according to the preamble of claim 1. The invention also relates to a wiper blade, in particular for fastening on a wiper arm according to the invention, and to a wiper device, consisting of a wiper arm according to the invention and a wiper blade according to the invention.

A wiper arm according to the preamble of claim 1 is already known. It has a slide-like securing element which is connected to the wiper arm and serves for holding a wiper blade adapter in a receiving region of the wiper arm. Also provided in the wiper arm is an adapter element, which is intended for supplying washing fluid and, during mounting or dismantling of a wiper blade, forms a hydraulic connection to the wiper blade.

Furthermore, DE 10 2011 118 220 A1 discloses a wiper arm which has a U-shaped cross section in a receiving region for a wiper blade adapter of a wiper blade. On the side facing the wiper blade adapter, receiving openings for projections arranged on the wiper blade adapter are formed on the side walls of the receiving region, starting from in each case a lower boundary edge of the side wall. It is also the case that the receiving region of the wiper arm is covered by a securing element, which likewise has substantially a U-shaped cross section and is arranged such that it can be displaced between a mounting or dismantling position for the wiper blade and an operating position for the wiper blade, the wiper blade being secured on the wiper arm in said operating position. The operations of mounting the wiper blade on the wiper arm and of dismantling the same therefrom take place substantially perpendicularly to the extent of the wiper blade or of the wiper arm.

Also known from the prior art are so-called "Aquablade" wiper blades in which a washing fluid is guided to spray openings on the longitudinal sides of the wiper blade. The wiper blade is supplied with the washing fluid here usually via a supply line in the form of a flexible hose guided within the wiper arm. The hose is hydraulically connected, at least indirectly, to the wiper blade adapter. The essential factor here is that the connections known from the prior art in this case usually take place in the longitudinal direction of the wiper arm, and therefore such connections are not suitable, in the case of the wiper arm according to DE 10 2011 118 220 A1 mentioned in the introduction, to ensure the hydraulic supply of the wiper blade with washing fluid at the same time, and without additional manual intervention, as the wiper blade is being mounted or dismantled.

DISCLOSURE OF THE INVENTION

Proceeding from the prior art presented, the object of the invention is to develop a wiper arm for a windscreen wiper system of a motor vehicle according to the preamble of claim 1 such that said wiper arm is suitable, along with relatively straightforward mounting, to establish both a hydraulic and an electrical connection between a wiper blade and a wiper arm via the adapter element, and wherein, at the same time, the operations of hydraulically and electrically coupling the wiper blades to the adapter element in the wiper arm, and separating the same therefrom, should be separate from the actual direction in which the wiper blade is mounted on the wiper arm or dismantled therefrom. This object is achieved according to the invention, in the case of a wiper arm for a windscreen wiper system of a motor vehicle having the features of claim 1, in that the first wiper blade adapter element, which can be connected to the adapter element, is coupled to the securing element such that, in a manner corresponding to the position of the securing element in the locking position, the adapter element is connected to the first wiper blade adapter element and, in the dismantling position, the adapter element is separated from the first wiper blade adapter element.

In other words, by virtue of the securing element being coupled to a wiper blade adapter element, a movement of the securing element simultaneously recauses the wiper blade to be coupled hydraulically and electrically to the adapter element in the wiper arm. During dismantling, therefore, first of all, a corresponding movement of the securing element causes the hydraulic and electrical connection of the wiper blade to be released from the adapter element in the wiper arm and then a corresponding movement on the wiper arm causes the wiper blade to be pulled out of the receiving region of the wiper arm. A wiper blade is mounted on a wiper arm according to the invention in an analogous manner in that the wiper blade first of all is introduced into the receiving region of the wiper arm, and in that then a corresponding movement of the securing element causes the wiper blade adapter element of the wiper blade, on the one hand, to enable the hydraulic and electrical coupling of the wiper blade to the adapter element in the wiper arm and, on the other hand, to block the wiper blade in the receiving opening of the wiper arm.

Advantageous developments of the wiper arm according to the invention for a windscreen wiper system of a motor vehicle are given in the dependent claims.

A particularly preferred design is one in which the coupling of the securing element to the first wiper blade adapter element takes place via a form-fitting connection, which has a projection on the securing element or on the first wiper blade adapter element, said projection engaging in an opening on the first wiper blade adapter element or on the securing element. Such a design makes it possible, by virtue of the projection being introduced into the opening in a particularly straightforward manner, for the wiper blade adapter to be connected, or coupled, to the securing element in the manner desired. It is likewise the case that the two elements are separated particularly straightforwardly by virtue of the projection being guided out of the opening.

A particular provision is made for the outlet and/or the plug connection to be aligned with the actuating direction of the securing element.

The invention also covers a wiper blade, in particular also for fastening on a wiper arm according to the invention, wherein the wiper blade comprises a wiper blade adapter consisting of several wiper blade adapter elements and constructed to be received in a wiper arm, wherein the direction in which the wiper blade adapter is mounted on the wiper arm, or dismantled therefrom, runs substantially perpendicularly to the longitudinal axis of the wiper blade. Provision is made according to the invention for a first wiper blade adapter element of the wiper blade adapter to have formed on it an inlet for supplying a washing fluid and/or a connection element for supplying power, and for the inlet and/or the connection element to be oriented perpendicularly to the direction in which the wiper blade adapter is mounted on the wiper arm or dismantled therefrom.

In the configuration of the wiper blade adapter which is particularly preferred in design terms, provision is made for the wiper blade adapter to have at least three wiper blade adapter elements, the first wiper blade adapter element, which is constructed to be connected to an adapter element on the wiper arm, a second wiper adapter element, on the side walls of which extensions are constructed for introducing into receiving openings of a wiper arm, and a third wiper blade adapter element, which is connected to the wiper blade body.

In order, on the one hand, to allow the required swivelability of the wiper blade on the wiper arm and, on the other hand, to realize the desired coupling of the securing element to the wiper blade adapter element, it is particularly preferred if the second and the third wiper blade adapter elements are arranged such that they can be swiveled in relation to one another, and if the first wiper blade adapter element is arranged such that it can be swiveled in relation to the third wiper blade adapter element and can be moved in a translatory manner in relation to the second wiper blade adapter element.

In order to achieve the swivelability between the first and the third wiper blade adapter elements, provision is made in design terms for the first wiper blade adapter element to have first extensions, which engage in recesses of the third wiper blade adapter element to achieve the swivelability between the first and the third wiper blade adapter elements.

In the case of such a design, provision may also be made, in a further-reaching embodiment for the first extensions to form a stop for delimitation of the swivel angle between the first and the third wiper blade adapter elements.

In order to achieve the translatory movement of the first wiper blade adapter element, provision is made for the first wiper blade adapter element to have formed on it second extensions or holding webs, which engage in a guide or in a slot-shaped receiving opening to achieve the translatory movement between the first and the second wiper blade adapter elements.

Further advantageous configurations of the invention relate, in particular, to the orientation of the individual wiper blade adapter elements in relation to one another in the mounted or dismantled state. Thus, in a first configuration, provision is made for the third wiper blade adapter element to have formed on it third, preferably cylindrical, extensions which, for forming a latching connection in a mounted or dismantled position of the wiper blade adapter, engage in holding openings which are formed on the second wiper blade adapter element.

A further configuration makes provision for the first wiper blade adapter element to have formed on it fourth, preferably cylindrical, extensions which, at least for delimitation of the translatory movement of the first wiper blade adapter element, cooperate with holding openings formed on the third wiper blade adapter element.

Finally, the invention also covers a wiper device for cleaning vehicle windows, comprising a wiper arm according to the invention and a wiper blade according to the invention.

Figure 2:
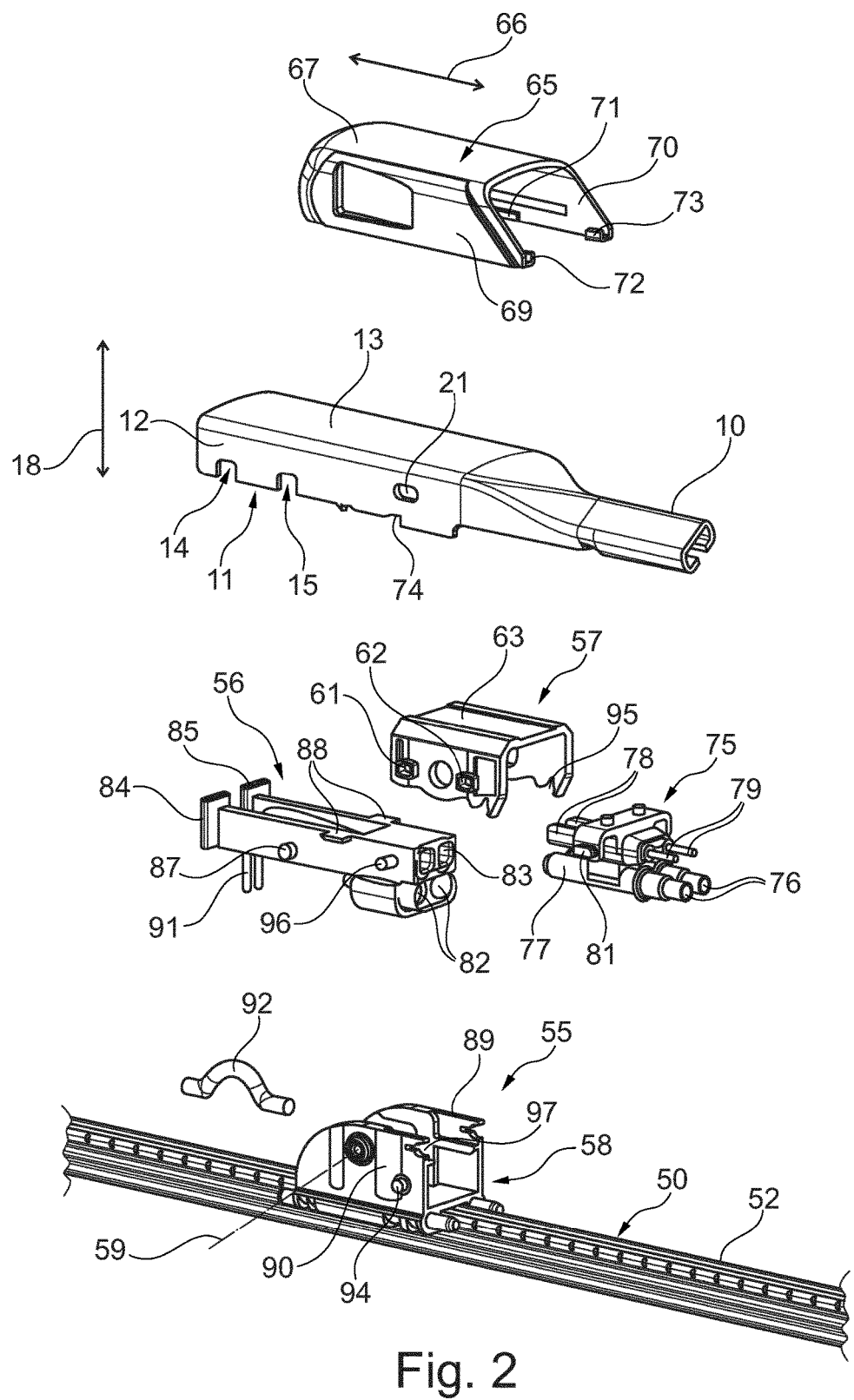
Figure 3:
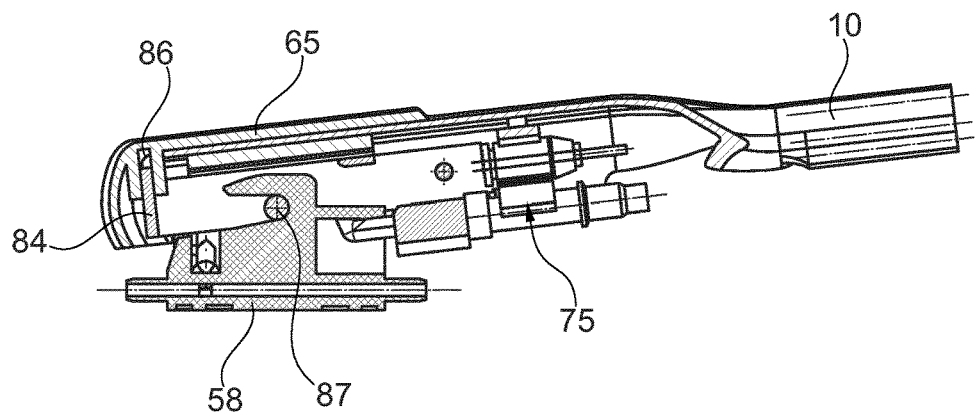
Figure 4:
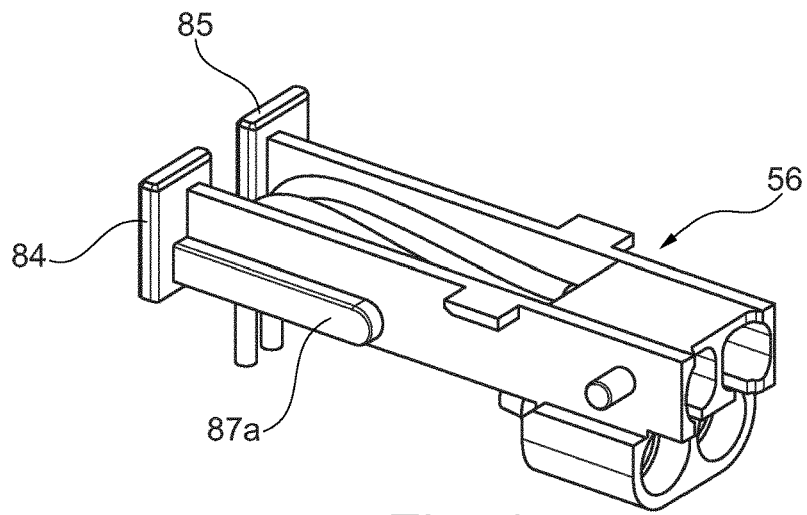
Figure 5:
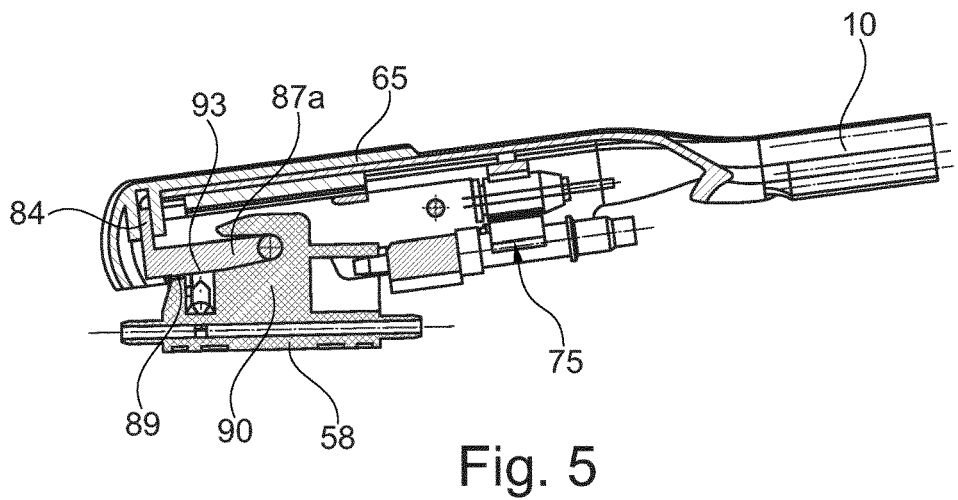
Figure 7:
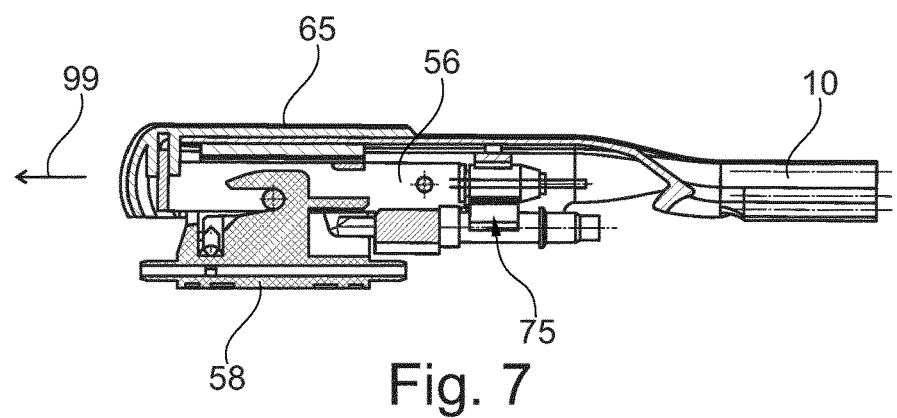
Figure 8:
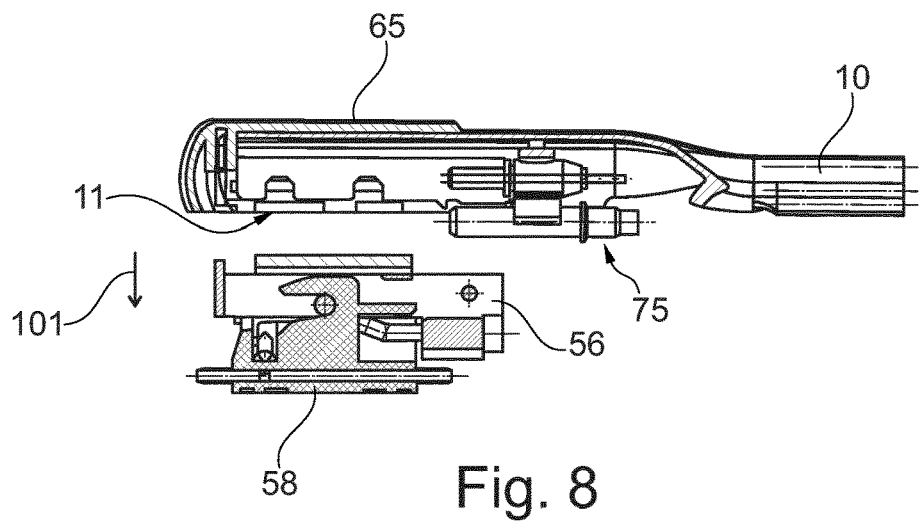
Figure 9:
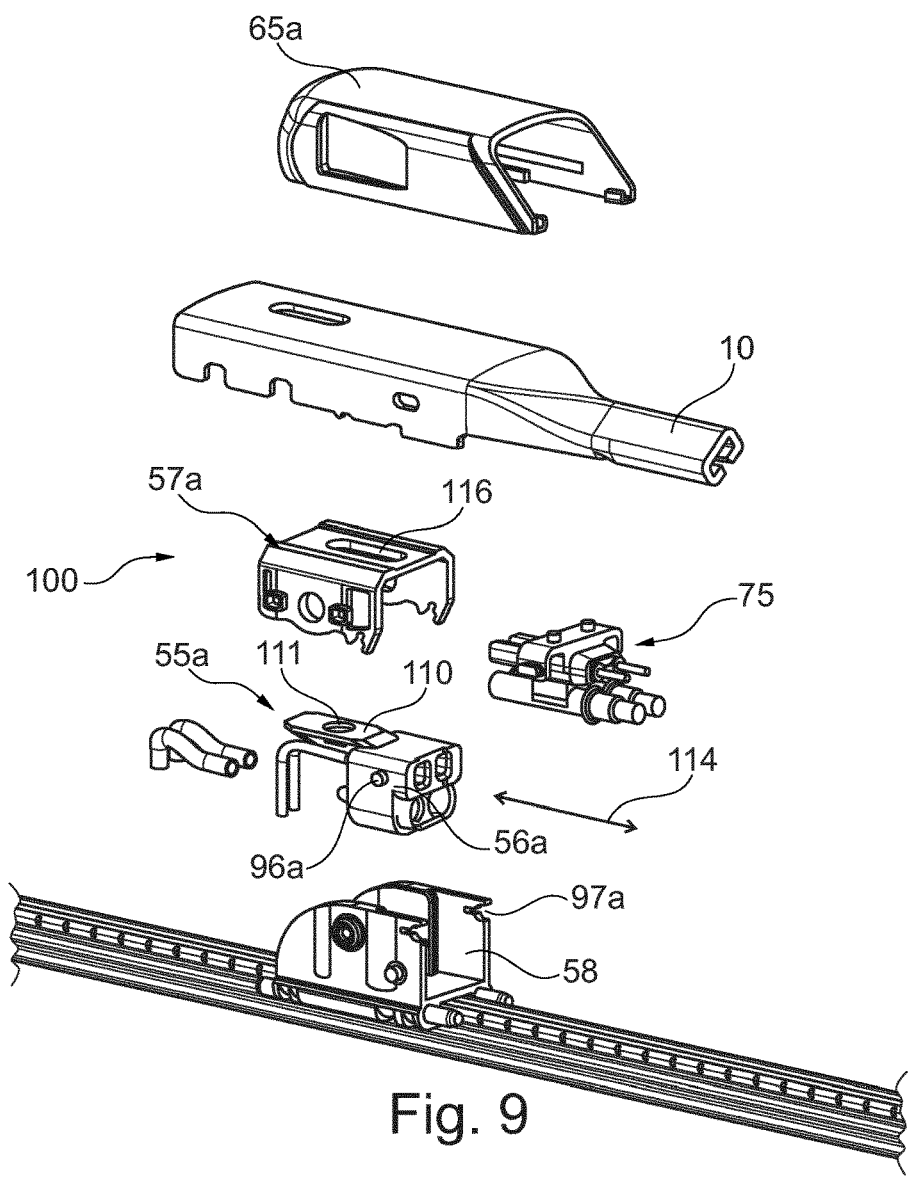
Figure 10:
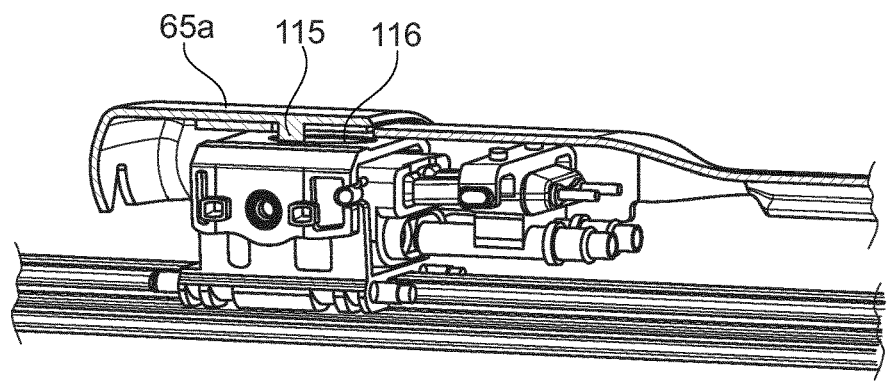
Figure 11:
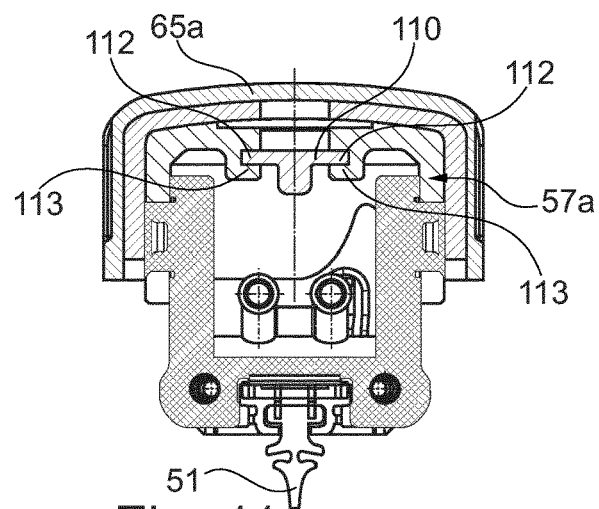
Figure 12:
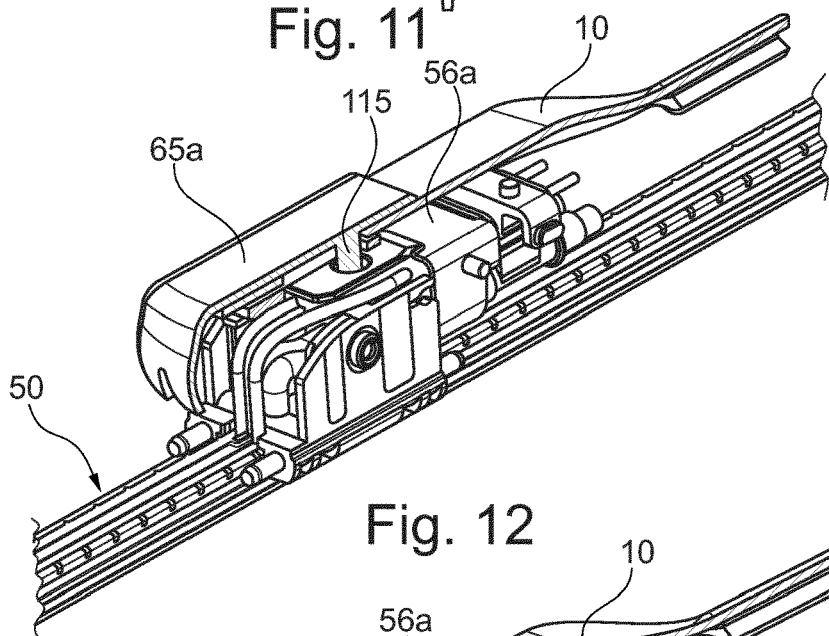
Figure 13:
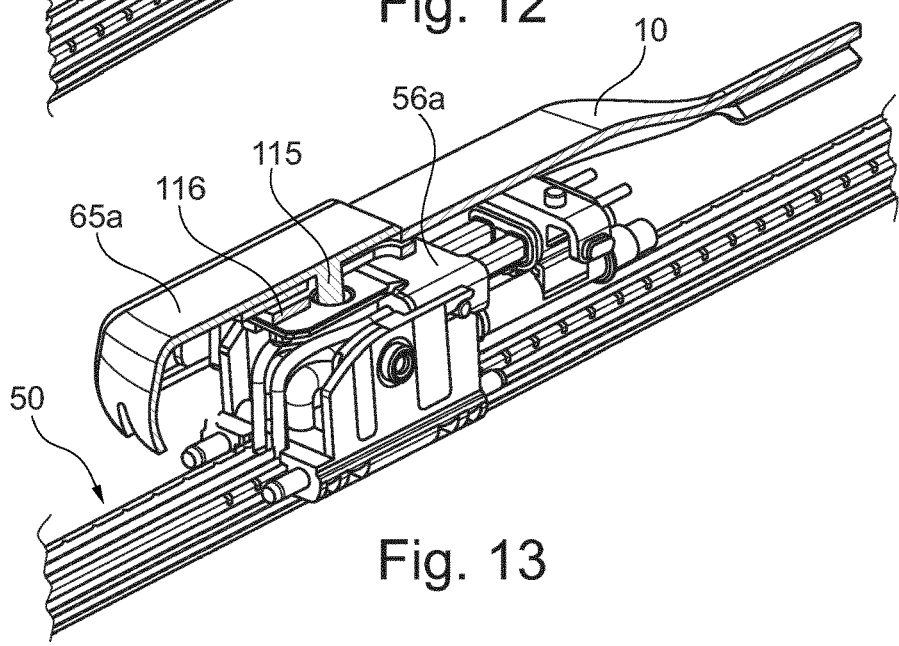

Further advantages, features and details of the invention can be gathered from the following description of preferred exemplary embodiments and with reference to the drawing, in which:

FIG. 1 shows a perspective illustration of a wiper device according to the invention for cleaning a vehicle window, the wiper device consisting of a wiper blade according to the invention and a wiper arm according to the invention, FIG. 2 shows an exploded illustration of the constituent parts of a first embodiment of the wiper device according to the invention, FIG. 3 shows a longitudinal section through the region of connection between a wiper blade adapter and a wiper arm, FIG. 4 shows a perspective illustration solely of a wiper blade adapter element which is modified in relation to FIG. 2, FIG. 5 shows a longitudinal section through the region of connection between a wiper blade adapter and a wiper arm using the wiper blade adapter element according to FIG. 4, FIGS. 6 to 8 show, each a longitudinal section, different phases during an operation for dismantling a wiper blade from a wiper arm, FIG. 9 shows an exploded illustration of the wiper device in an embodiment which is modified in relation to FIG. 2, FIG. 10 shows a partially sectional illustration of a perspective view of the region of connection of the wiper device according to FIG. 9, FIG. 11 shows a section through the region of connection of the wiper device according to FIG. 10, and FIGS. 12 and 13 each show a perspective illustration, partially in section, of the securing element on the wiper arm, in the case of the wiper device according to FIG. 9, in the operating position and in the dismantling position, respectively.

Like elements and elements having a like function are provided with like designations in the figures.

FIG. 1 illustrates a first wiper device 100 of a windscreen wiper system for cleaning a motor-vehicle window (not shown). The wiper device 100 has a wiper arm 10, which is illustrated merely in part, and a wiper blade 50, which is fastened in an interchangeable manner on the wiper arm 10. The wiper blade 50 comprises a rubber component 51, which can be positioned against the vehicle window and is arranged within a wiper blade body 52. The elongate wiper blade body 52 has, at each of its two end regions, a covering cap 53, 54 and, on at least one longitudinal side, spray openings for applying a washing fluid to the vehicle window, said spray openings being known from the prior art and therefore not being illustrated. Furthermore, the wiper blade 50, as is likewise known per se from the prior art, is designed in the form of a heatable wiper blade 50.

A wiper blade adapter 55 is connected to the wiper blade body 52 of the wiper blade 50, as can be seen in particular with reference to FIG. 2. The wiper blade adapter 55 serves for fastening the wiper blade 50 on the wiper arm 10 in an interchangeable manner. The wiper blade adapter 55 consists of three interconnected wiper blade adapter elements 56 to 58. The wiper blade adapter elements 56 to 58 are formed as injection mouldings from plastics material, wherein the second wiper blade adapter element 57 and the third wiper blade adapter element 58 are arranged such that they can be swiveled in relation to one another along an axis of rotation 59, so as to ensure that, when the wiper arm 10 is swiveled during wiper operation, the wiper blade 50 is adapted to, and butts against, the usually curved vehicle window.

The wiper arm 10, which consists of sheet metal, is constructed in the form of a punched/bent part and has in a receiving region 11 for the wiper blade adapter 55 a substantially U-shaped cross section. Provided for this purpose in the receiving region 11 are two side walls 12, which are arranged parallel to one another, and a transversal wall 13, which connects the two side walls 12 to one another and forms the upper side of the wiper arm 10 in the receiving region 11. On that side of the two side walls 12 which faces away from the transverse wall 13, said side walls each have two receiving openings 14, 15, which are spaced apart from one another in the longitudinal direction of the wiper arm 10. The two receiving openings 14, 15 have side edges running perpendicularly to the transverse wall 13 and parallel to a direction, indicated by the double arrow 18, in which the wiper blade 50 is mounted on the wiper arm 10 or dismantled therefrom (wherein the mounting or dismantling direction is arranged at least substantially perpendicularly to the longitudinal axis of the wiper arm in the receiving region 11). The receiving openings 14, 15 cooperate in a form-fitting manner with extensions 61, 62, which are formed in one piece on the sides of the second wiper blade adapter element 57 and can be introduced into the receiving openings 14, 15. In the case of extensions 61, 62 being introduced into the receiving openings 14, 15, the upper side 63 of the second wiper blade adapter element 57 terminates approximately flush with the underside of the transverse wall 13 of the wiper arm 10.

In order to secure the wiper blade adapter 55 or the wiper arm 10 in a wiping or operating position, the wiper arm 10 is covered, at least in the receiving region 11, by a securing element 65 having a substantially U-shaped cross section. The securing element 65 is arranged such that it can be moved back and forth in the direction of the double arrow 66 (in a direction perpendicular to the direction of the double arrow 18) and encloses, or covers, the receiving region 11 on the side facing away from the wiper blade 50. The securing element 65, which consists of plastics material and is constructed in the form of an injection moulding, has an upper side 67, which is arranged to cover over the transverse wall 13 of the wiper arm 10. The securing element 65 also comprises two side walls 69, 70, which are arranged parallel to one another and on which inwardly projecting holding projections 71 are formed on the side facing away from the upper side 67. As is known per se from the prior art, the holding projections 71 serve to free or close the receiving openings 14, 15 on the wiper arm 10, depending the position of the securing element 65. In order for the wiper blade 50 to be mounted on the wiper arm 10, or dismantled therefrom, the securing element 65 is in such a position that the holding projections 71 free the receiving openings 14, 15 on the wiper arm 10, and therefore it is possible for the wiper blade 50 to be introduced by way of its extensions 61, 62 into the receiving openings 14, 15 in the mounting direction, running substantially perpendicularly to the longitudinal axis of the wiper blade, or pulled out of the same in the dismantling direction, running substantially perpendicularly to the longitudinal axis of the wiper blade. In order to secure the wiper blade 50 on the wiper arm 10, the securing element 65 can be moved in the direction of the wiper arm 10 until it reaches a locking position, which is achieved by stops 72, 73, formed on the inside of the side walls 69, 70, when said stops engage in holding openings 74 on the wiper arm 10. In this position, the holding projections 71 block the receiving openings 14, 15 and prevent the wiper blade 50 from moving in the direction of the double arrow 18 on the wiper arm 10.

Within the U-shaped cross section of the wiper arm 10, the wiper arm 10 has arranged in it an adapter element 75 for supplying washing fluid and for supplying power to the heating device of the wiper blade 50, said heating device being arranged in the wiper blade body 52. The adapter element 75, which is constructed in the form of an injection moulding, has on the side facing away from the wiper blade 50 two inflow connectors 76 for the washing fluid, said connectors being connected to supply hoses (not illustrated) which are arranged in the cross section of the wiper arm 10 and are connected to a washing fluid source. In extension of the inflow connectors 76, the latter have, on the side facing the wiper blade adapter 55, to outlets 77 for the washing fluid. Arranged above, and parallel to, the outlets 77 are two connection plugs 78, which serve to transmit power and are connected, on the side facing away from the wiper blade adapter 55, to lines 79 guided within the wiper arm 10. The outlets 77 and the connection plugs 78 run parallel to the transverse wall 13 of the wiper arm 10 or parallel to the direction of the double arrow 66, that is to say in the displacement direction of the securing element 65.

The adapter element 75 is connected to the wiper arm 10 by a latching connection. For this purpose, the adapter element 75 has on side walls facing away from one another a respective holding protuberance 81, which has a rectangular outer contour with two round end edges. The retaining protuberances 81 engage in holding openings 21 on the wiper arm 10, said holding openings being formed in a manner corresponding to the contour of the retaining protuberances 81, such that the adapter element 75 is arranged at least substantially rigidly within the wiper arm 10.

The adapter element 75 cooperates with the first wiper blade adapter element 56. For this purpose, the first wiper blade adapter element 56 has on the side facing the adapter element 75 two entry connectors 82, which can be connected to the outlets 77, and a plug connection element 83. The essential factor is for the first wiper blade adapter element 56 to be arranged, within the cross section of the wiper arm 10, such that it can be moved in a translatory manner parallel to the transverse wall 13 or to the direction of the double arrow 66, that is to say in the displacement direction of the securing element 65. For this purpose, the first wiper blade adapter element 56 has on the side facing away from the adapter element 75 two plate-like driver elements 84, 85 or holding projections, which serve as end-side terminations and engage with form-fitting action, in a manner corresponding to the illustration of FIG. 3, in holding openings 86 of the securing element 65, said holding openings being arranged on the underside or inner side of the securing element 65.

The first wiper blade adapter element 56 has furthermore, approximately in the centre of each side surface, a cylindrically formed first extension 87, which engages in an in particular slot-shaped aperture constructed in the third wiper blade adapter element 58, and therefore the first wiper blade adapter element 56 is mounted such that it can be rotated in relation to the third wiper blade adapter element 58 about the axis of rotation of the first extensions 87. On the upper side of the first wiper blade adapter element 56, the latter also has outwardly projecting second extensions 88, which are each rectangular in plan view and, with the wiper blade adapter 55 in the mounted state, butt against the inner side or underside of the second wiper blade adapter element 57, which has a U-shaped cross section. On that side of the second extensions 88 which faces away from the second wiper blade adapter element 57, said extensions project up to the upper sides 89 of the side walls 90 of the third wiper blade adapter element 58, which likewise has a substantially U-shaped cross section and therefore the second extensions 88 are guided between the two wiper blade adapter elements 56, 58, in order to allow the translatory movement of the first wiper blade adapter element 56.

The electrical connection between the first wiper blade adapter element 56 and the third wiper blade adapter element 58 takes place by means of connecting lines 91 arranged in the region of the first wiper blade adapter element 56. Short connecting hoses 92 are likewise provided, and these ensure the hydraulic supply to the wiper blade body 52 or the third wiper blade adapter element 58 from the first wiper blade adapter element 56.

Instead of the cylindrically formed first extensions 87, provision may be made, in a manner corresponding to the illustration of FIGS. 4 and 5, for the first extensions 87a to be constructed in the form of elongate extensions 87a. As a result, in a manner corresponding to the illustration of FIG. 5, the underside 93 of the first extension 87a, in order to limit the swivel angle between the first wiper blade adapter element 56 and the third wiper blade adapter element 58, butts against the upper side 89 of the side wall 90 of the third wiper blade adapter element 58 when the maximum swivel angle is reached. In contrast, with reference to the illustration of FIG. 3, when use is made of first extensions 57, it can be seen that it is possible to realize a pivot angle between the wiper blade adapter elements 56 and 58 which is larger than that achievable when use is made of first extensions 87a.

Also formed on the outer sides of the side walls 90 of the third wiper blade adapter element 58 are third extensions 94, which, in the form of cross-sectionally cylindrically formed third extensions 94 cooperate with holding openings 95 formed on the second wiper blade adapter element 57. Finally, on the side facing the adapter element 75, the first wiper blade adapter element 56 has, in the region of each of its two side surfaces facing away from one another, fourth extensions 96, which are likewise circular in cross section. The fourth extensions 96 cooperate with further holding openings 97, formed on the third wiper blade adapter element 58, and delimit the translatory displaceability of the first wiper blade adapter element 56 in relation to the third wiper blade adapter element 58, since the further holding openings 97 act as stop elements for the fourth extensions 96.

Figure 6:
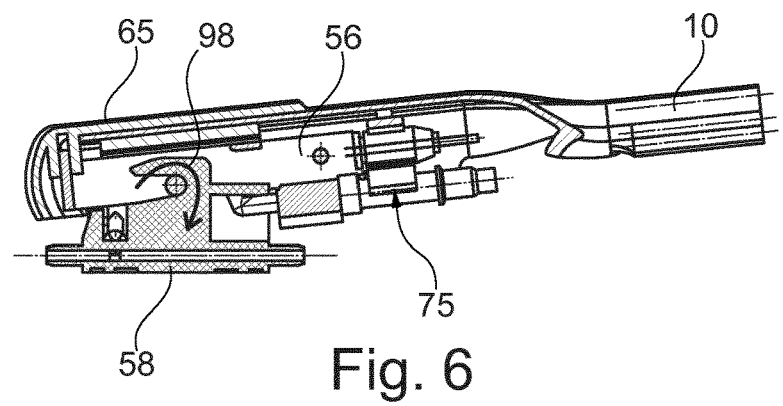

The operation of dismantling the wiper blade 50 from the wiper arm 10 will now be explained with reference to the sequence of figures shown in FIGS. 6 to 8: first of all, it is necessary to align the wiper blade 50 or the third wiper blade adapter element 58 parallel to the wiper arm 10 in the receiving region 11. This takes place by for example the wiper arm 10 being rotated clockwise in the direction of the arrow 98 (FIG. 6). The corresponding alignment of the wiper blade 50 in relation to the wiper arm 10 is illustrated in FIG. 7. Then, the securing element 65 is moved in the direction of the arrow 99, wherein the coupling between the securing element 65 and the first wiper blade adapter element 56 means that the latter is moved along as well. The movement of the securing element 65, on the one hand, frees the receiving openings 14, 15 on the wiper arm 10; on the other hand, the hydraulic and electrical connection between the wiper blade adapter 55 and the adapter element 75 is released via the first wiper blade adapter element 56. Thereafter, in a manner corresponding to the illustration of FIG. 8, a relative movement takes place between the wiper arm 10 and the wiper blade 50 or the wiper blade adapter 55 in the direction of the arrow 101, as a result of which the wiper blade adapter 55 can be removed from the receiving region 11 of the wiper arm 10. The operation of mounting the wiper blade 50 or the wiper blade adapter 55 on the wiper arm 10 takes place in an analogous manner in reverse order.

FIG. 9 illustrates a second, modified wiper device 100, which differs from the above described embodiment in particular by way of a differently constructed wiper blade adapter 55a. In particular, it can be seen that the first wiper blade adapter element 56a has on its upper side a knob-like elevation 110, in the centre of which a (cylindrical) receiving opening 111 is formed. As can be seen in particular with reference to the illustration of FIG. 11, the elevation 110 also has a T-shaped cross section with two holding webs 112, which engage in slot-shaped receiving openings 113 formed on the inner side or underside of the second wiper blade adapter element 57a. Via the holding webs 112 and receiving openings 113, the first wiper blade adapter element 56a is arranged such that it can be moved in a translatory manner, in the direction of the double arrow 114 in relation to the second wiper blade adapter element 57a.

As can be seen in particular with reference to FIGS. 10, 12 and 13, the receiving opening 113 has projecting into it a holding projection which is formed on the securing element 65a, is in the form of a drive pin 115 and passes through an elongate, slot-shaped through-opening 116 formed on the second wiper blade adapter element 57a. The securing element 65a is thus coupled, or connected, to the first wiper blade adapter element 56a via the driver pin 115. In a manner analogous to the first-described exemplary embodiment, it is also the case that the first wiper blade adapter element 56a has on opposite side surfaces fourth extensions 96a, which engage in corresponding holding openings 97a formed on the third wiper blade adapter element 58a.

FIG. 12 illustrates the operating position of the wiper blade 50 on the wiper arm 10, the first wiper blade adapter element 56a being connected, or coupled, hydraulically and electrically to the adapter element 75. In contrast, FIG. 13 illustrates the state in which the securing element 65a, together with the first wiper blade adapter element 56a, has been moved into a mounting or dismantling position, and therefore the first wiper blade adapter element 56a is spaced apart from the securing element 65a and the electrical and/or hydraulic connection has been interrupted.

The wiper device 100 described thus far, in particular the wiper arm 10 and wiper blade 50 thereof may be modified in a variety of different ways without departing from the concept of the invention.

LIST OF DESIGNATIONS

10 Wiper arm
11 Receiving region
12 Side wall
13 Transverse wall
14 Receiving opening
15 Receiving opening
18 Double arrow
21 Holding opening
50 Wiper blade
51 Rubber component
52 Wiper blade body
53 Covering cap
54 Covering cap
55, 55a Wiper blade adapter
56, 56a Wiper blade adapter element
57, 57a Wiper blade adapter element
58 Wiper blade adapter element
59 Axis of rotation
61 Extension
62 Extension
63 Upper side
65, 65a Securing element
66 Double arrow
67 Upper side
69 Side wall
70 Side wall
71 Holding projection
72 Stop
73 Stop
74 Holding opening 75 Adapter element
76 Inflow connector
77 Outlet
78 Connection plug
79 Line
81 Holding protuberance
82 Entry connector
83 Plug connection element
84 Driver element
85 Driver element
86 Holding opening
87, 87a Extension
88 Extension
89 Upper side
90 Side wall
91 Connecting line
92 Connecting hose
93 Underside
94 Extension
95 Holding opening
96, 96a Extension
97, 97a Holding opening
98 Arrow
99 Arrow
100 Wiper device
101 Arrow
110 Elevation
111 Receiving opening
112 Holding web
113 Receiving opening
114 Double arrow
115 Driver pin
116 Through-opening

The invention claimed is:

1. A wiper arm for a windscreen wiper system of a motor vehicle, comprising:
a receiving region for a wiper blade adapter consisting of several wiper blade adapter elements; and
a securing element which at least partially covers the receiving region, wherein the securing element is a slider and has a U-shaped profile in a cross section comprising a back and two limbs,
wherein the securing element is movable between a dismantling position, in which the wiper blade adapter is removed from the receiving region, and a locking position, in which the wiper blade adapter is held in the receiving region, the securing element comprising holding projections configured to prevent the wiper blade adapter from moving from the receiving region,
wherein, in the receiving region, an adapter element is arranged for the supplying of washing fluid and/or current, and wherein the adapter element is able to be connected with a supply line for the washing fluid and/or with an electric line, and has an outlet for the washing fluid and/or a plug connection for the electric line, wherein the outlet and/or the plug connection is able to be connected with a first wiper blade adapter element of the several wiper blade adapter elements,
wherein the first wiper blade adapter element, connectable with the adapter element, is coupled with the securing element such that according to the position of the securing element in the locking position, the adapter element is connected with the first wiper blade adapter element and in the dismantling position, the adapter element is separated from the first wiper blade adapter element,
wherein at least one projection is arranged on the limbs of the slider,
wherein in the locking position the adapter element is directly attached to and in contact with the first wiper blade adapter element,
wherein the receiving region includes two side walls connected by a transverse wall, the two side walls and the transverse wall forming a concave internal surface which houses each of the adapter element and the first wiper blade adapter element, and
wherein the securing element is coupled to the first wiper blade adapter element via a form-fitting connection between driver elements formed on the first wiper blade adapter element and corresponding openings formed on the securing element.

2. The wiper arm according to claim 1, wherein the receiving region has a U-shaped cross-section with the two side walls parallel to one another, and with a transverse wall connecting the two side walls, and with at least two receiving openings formed on the side walls for receiving extensions arranged on the wiper blade adapter in a dismantling direction running at least substantially perpendicularly to the transverse wall, wherein the securing element in the dismantling position of the wiper blade adapter exposes the receiving openings.

3. The wiper arm according to claim 1, wherein the outlet and/or the plug connection is aligned with a mounting or respectively dismantling direction of the securing element.

4. The wiper arm according to claim 1, wherein the adapter element has respectively a holding protuberance on a side facing a side wall, which projects into a holding opening, having a closed cross-section, of the side wall.

5. A wiper blade for fastening to the wiper arm according to claim 1,
wherein a mounting or respectively dismantling direction of the wiper blade adapter on or respectively from the wiper arm runs substantially perpendicularly to a longitudinal axis of the wiper blade,
wherein on the first wiper blade adapter element of the wiper blade adapter an inlet is constructed for the supplying of the washing fluid and/or a connection element is constructed for the current supply, and that the inlet and/or the connection element is aligned perpendicularly to a mounting or respectively dismantling direction of the wiper blade adapter on the wiper arm.

6. A wiper device for cleaning vehicle windows, comprising:
the wiper arm according to claim 1; and
a wiper blade wherein the wiper blade adapter consisting of several wiper blade adapter elements, is received in the wiper arm,
wherein a mounting or respectively dismantling direction of the wiper blade adapter on or respectively from the wiper arm runs substantially perpendicularly to a longitudinal axis of the wiper blade, wherein on a first wiper blade adapter element of the wiper blade adapter an inlet is constructed for the supplying of a washing fluid and/or a connection element is constructed for the current supply, and that the inlet and/or the connection element is aligned perpendicularly to the mounting or respectively dismantling direction of the wiper blade adapter on the wiper blade.

7. A wiper blade, comprising: a wiper blade adapter consisting of several wiper blade adapter elements
a receiving region receiving the wiper blade adapter consisting of several wiper blade adapter elements;

a securing element which at least partially covers the receiving region, wherein the securing element is a slider and has a U-shaped profile in a cross section comprising a back and two limbs; and wherein a mounting or respectively dismantling direction of the wiper blade adapter runs substantially perpendicularly to a longitudinal axis of the wiper blade, wherein the securing element is movable between a dismantling position, in which the wiper blade adapter is removed from the receiving region, and a locking position, in which the wiper blade adapter is held in the receiving region, wherein, in the receiving region, an adapter element is arranged for the supplying of washing fluid and/or current, and wherein the adapter element is able to be connected with a supply line for the washing fluid and/or with a electric line, and has an outlet for the washing fluid and/or a plug connection for the electric line, wherein the outlet and/or the plug connection is able to be connected with a first wiper blade adapter element of the several wiper blade adapter elements, wherein the first wiper blade adapter element, connectable with the adapter element, is coupled with the securing element such that according to the position of the securing element in the locking position, the adapter element is connected with the first wiper blade adapter element and in the dismantling position, the adapter element is separated from the first wiper blade adapter element, wherein at least one projection is arranged on the limbs of the slider, wherein the adapter element is directly attached to and in contact with the first wiper blade adapter element, wherein the receiving region includes two side walls connected by a transverse wall, the two side walls and the transverse wall forming a concave internal surface which houses each of the adapter element and the first wiper blade adapter element, wherein on the first wiper blade adapter element of the wiper blade adapter an inlet is constructed for the supplying of the washing fluid and/or a connection element is constructed for the current supply, and that the inlet and/or the connection element is aligned perpendicularly to the mounting or respectively dismantling direction of the wiper blade adapter, and wherein the wiper blade adapter has at least three wiper blade adapter elements, the first wiper blade adapter element, which is connected with the adapter element, a second wiper blade adapter element, on side walls of which extensions are constructed for introducing in receiving openings of the wiper arm, and a third wiper blade adapter element, which is connected with a wiper blade body.

8. The wiper blade according to claim 7, wherein the second and the third wiper blade adapter elements are arranged swivelably with respect to one another, and that the first wiper blade adapter element is arranged swivelably to the third wiper blade adapter element and movably in a translatory manner to the second wiper blade adapter element.

9. The wiper blade according to claim 8, wherein the first wiper blade adapter element has first extensions, which engage in recesses of the third wiper blade adapter element to achieve the swivelability between the first and the third wiper blade adapter elements.

10. The wiper blade according to claim 9, wherein the first extensions form a stop for delimitation of the swivel angle between the first and the third wiper blade adapter elements.

11. The wiper blade according to claim 8, wherein on the first wiper blade adapter element extensions or holding webs are constructed, which engage into a guide or into a slot-shaped receiving opening to achieve the translatory movement between the first and the second wiper blade adapter elements.

12. The wiper blade according to claim 8, wherein on the third wiper blade adapter element cylindrical extensions are constructed which, for forming a latching connection in a mounting position or the dismantling position of the wiper blade adapter, engage in holding openings which are formed on the second wiper blade adapter element.

13. The wiper blade according to claim 8, wherein on the first wiper blade adapter element cylindrical extensions are constructed which, at least for delimitation of the translatory movement of the first wiper blade adapter element, cooperate with holding openings formed on the third wiper blade adapter element.

* * * * *